(12) United States Patent
Ruckwied

(10) Patent No.: US 6,773,152 B2
(45) Date of Patent: Aug. 10, 2004

(54) HEADLIGHT

(75) Inventor: Heinz Ruckwied, Kusterdingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 10/385,142

(22) Filed: Mar. 10, 2003

(65) Prior Publication Data
US 2003/0174508 A1 Sep. 18, 2003

(30) Foreign Application Priority Data
Mar. 12, 2002 (DE) .......................... 102 10 874

(51) Int. Cl.⁷ .............................. B60Q 1/06; F21V 7/00; F21V 21/30
(52) U.S. Cl. ........................ 362/525; 362/526; 362/275; 362/514
(58) Field of Search ................................. 362/272, 275, 362/512–515, 525, 526, 530, 467

(56) References Cited

U.S. PATENT DOCUMENTS 4,935,853 A * 6/1990 Collins ....................... 362/272
5,567,035 A * 10/1996 Dobler et al. ............... 362/514
5,613,754 A * 3/1997 Dobler et al. ............... 362/514
6,641,292 B2 * 11/2003 Miki et al. ................... 362/513

FOREIGN PATENT DOCUMENTS

| DE | 101 29 968 A1 | | 1/2003 |
| EP | 0990558 | * | 4/2000 |
| FR | 2424157 | * | 4/1978 |
| JP | 2002234383 | * | 8/2002 |

* cited by examiner

Primary Examiner—Alan Cariaso
Assistant Examiner—Ali Alavi
(74) Attorney, Agent, or Firm—Michael J. Striker

(57) ABSTRACT

A headlight for a motor vehicle has a light module with at least one reflector and a light source, a first frame with which at least a part of the light module is connected, a first adjusting element for swivelling the first frame around a first swivel axis, a second frame in which the first frame is supported and which is turnable around a second swivel axis, a second adjusting element for swivelling the second swivel frame, a body-fixed frame support in which the second frame is supported, the frames being arranged so that the swivel axes extend perpendicular to one another and arranged in one plane, a base adjustment element for adjusting at least one of the frames around an adjusting axis which is aligned with one of the swivel axis.

10 Claims, 4 Drawing Sheets

HEADLIGHT

BACKGROUND OF THE INVENTION

The present invention generally relates to headlights for vehicles

More particularly, it relates to a headlight for a vehicle, in particular a motor vehicle, which has a light module with at least one reflector, a light source and an optional projection optical system, wherein at least a part of the light module is connected with a first frame. The first frame is swivable about a first swivelling axis by a first adjusting means supported in a second frame, wherein the second frame is swivable by a second adjusting means about a second swivelling axis supported in a body-fixed frame carrier. The swiveling axes are arranged perpendicular to one another in one plane, and at least one of the frames is adjustable by a base adjusting means around an adjusting axis.

Headlights to be used in vehicles have in conventional constructions, a light source, a reflector and a cover member with or without a dispersion optical system. The headlights of this type have a disadvantage that the reflectors require a relatively significant space to provide a satisfactory quality or brightness of the low beam. From design and flow-technique reasons, it is however desired to reduce the mounting space required for a headlight. This can be achieved for example by the use of so-called PES (poly-ellipsoid system). PES-headlights have a low beam optical system which projects the light produced by the light source and reflected by the reflector onto the roadway in front of the vehicle. With the PES system the mounting space occupied by the headlight is significantly reduced when compared with conventional headlights.

It is known to arrange headlights or parts of the headlight of the vehicle (the light module) movable relative to the vehicle body, for turning the headlight or parts of the headlight. For example the headlight or parts of the headlight can be turned about a horizontal swiveling axis to adjust the light range in the vertical direction. In Europe all new vehicles which are produced since Jan. 1, 1999 must have a light range regulation or a manually operated light range adjustment.

It is further known to arrange headlights or parts of the headlights swivelable about a second additional swiveling axis. For example the second swiveling axis can be arranged vertically to turn the light outlet direction of the headlight in a horizontal direction. With sufficiently large swiveling angles for example up to +/−15°, it is possible to execute a curve light operation. Thereby the light outlet direction of a headlight can be adjusted to a radius of a curve over which a vehicle is driving, to obtain an optimal illumination of the roadway, in particular over curves with a small curve radius.

It is known to support a headlight or parts of the headlights by cardans which simultaneously allow both a light range regulation and also a curved light operation. It is in particular known to design the cardan bearing so that at least a part of the headlight is connected with a first frame which is supported swivelably in a second frame, which is also supported swivelably in a body-fixed frame carrier.

It has been recognized that it is advantageous when the swiveling axes intersect in one point, and the intersection point of the axes from dynamic reasons can not be arranged in the vicinity of a center of gravity of headlight parts to be supported. By swiveling of the headlight parts around two intersecting axes the dimensions of gaps which occur between the movable parts of the headlight and the body-fixed parts which adjoin the movable headlight parts can be reduced. Such a headlight is disclosed for example in the pending and not published patent document DE 101 29 968.

For compensation of manufacturing tolerances, it is necessary to bring the headlight or the headlight parts at the end of the complete mounting of the vehicle to a base adjustment, in particular to satisfy the adjusting requirements which are prescribed in accordance with corresponding regulations. For this purpose base adjustment means are provided, with which the headlight or parts of the headlight are adjustable around an adjusting axis. The base adjusting means which are used for this purpose include adjusting screws which are for example in toothed engagement with the headlight or parts of the headlight via transmission elements.

It has been determined that in known headlights it is disadvantageous that the base adjustment of the headlight is possible only with a relatively large, disturbing gaps between vehicle-fixed and movable headlight parts.

SUMMARY OF THE INVENTION

Accordingly, it is an object of the present invention to provide a headlight of the above mentioned general type, which avoids the disadvantages of the prior art.

More particularly, it is an object of the present invention to provide a headlight which can be operate with a curve light function and a light range regulation, wherein an independent base adjustment of the headlight is possible with lowest possible curve dimensions between movable and vehicle-fixed parts of the headlight.

In order to achieve these objects, the adjusting axis is arranged so that it is aligned with one of the swiveling axes.

Since the adjusting axis is aligned with one of the swiveling axes, small gap dimension between movable and vehicle-fixed parts of the headlight is obtained with the cardanic suspension of the headlight or the headlight parts, without increasing the gap dimension for allowing the base adjustment.

With the proposed arrangement, the movable headlight parts are arranged so that their outer surfaces which are spaced the farthest from the intersection point of the swiveling axes, during their turning describe the surface of a sphere. The vehicle-fixed headlight parts adjoining the movable parts of the headlight, for example optical screens, can be arranged so that they directly adjoin a remaining minimum gap. With the spherical movement of the headlight parts, a gap formed by the distance between the movable and vehicle-fixed headlight parts remains constant. This is especially advantageous when for carrying out a curve light operation relatively great swiveling angle of +/−15° is required.

In accordance with a further embodiment of the present invention, the first and the second frames are adjustable correspondingly through base adjusting means around corresponding adjustment axes. The adjusting axes are arranged in alignment with the turning axes.

This arrangement guarantees that a base adjustment of the vehicle headlight can not be performed in horizontal and vertical directions without a large gap dimension between movable and vehicle-fixed headlight parts. For example a first frame is provided, on which the movable parts of the headlights, for example a light source, a reflector and/or a projection optical system are mounted. This first frame is horizontally swivelable about a first, vertical swiveling axis by means of a first adjusting means. Thereby a curve light operation can be executed. This first frame is arranged in a second frame which surrounds the first frame, which is swivelable about a second, horizontal swiveling axis by means of a second adjusting means. Thereby a light range regulation is possible. The second frame is supported in a body-fixed frame carrier.

In order to provide the base adjustment of the first and the second frames, the base adjustment means are provided. They are arranged in accordance with the present invention so that the adjusting axes around which the frames can swivel for their base adjustment are in alignment with the swiveling axes for swiveling the frames for executing the curve light function or the light range regulation. This arrangement allows to reduce the gap it between the movable and vehicle-fixed headlight parts to a minimum value.

In accordance with another embodiment of the invention, it is provided that base adjustment means operate between the frame carrier and the first frame and/or between the frame carrier and the second frame, and the base adjustment means adjusts the relative position of the first adjusting means to the first frame and/or the relative position of the second adjusting means to the second frame. The base adjustment means are arranged so that a swiveling of the first and second frames is not performed as in conventional systems by a direct action of the base adjustment means on the frames, but instead with interposition of the adjusting means. The base adjustment means provide the position and orientation of the adjustment means which thereby assume a predetermined relative position relative to the first and the second frames.

Advantageously the adjusting means each have an adjustment means drive and a stroke means connected with a frame through a hinge. The adjusting means drive can be activated for example pneumatically, hydraulically or electrically and stroke means can be formed as pistons. Such adjusting means and stroke means are advantageous and known from a plurality of industrial applications.

In accordance with a further embodiment of the present invention, the base adjustment means have correspondingly a base adjustment drive with a coupled first transmission member which is swivelable about a frame carrier-fixed axis. This first transmission member can support an adjustment means drive, wherein by swivelling the first transmission member a frame-fixed axis of this adjustment means drive is swivelable also to adjust the relative position between the adjusting means drive and one of the frames. For example, the first transmission member of the adjusting means drive carries the corresponding adjustment means, with which a frame is swivelable for light range regulation vertically about a horizontal swiveling axis.

In accordance with a further embodiment of the present invention, the first transmission member is coupled to a second transmission member, which carries an adjustment means drive and a first frame-fixed axis. For example via a base adjustment drive, a coupled first transmission member which is swivellable about a frame carrier-fixed axis can be swivelled. Thereby, a second transmission member which is coupled to the first transmission member is swivellable about a further axis, wherein the further axis is frame-fixed or in other words is arranged in one of the swivellable frames. These two transmission members can support as adjustment means drive, with which for example a frame is swivellable about a vertical swivelling axis in a horizontal direction. With the above described arrangement it is possible to swivel the second transmission member via the base adjustment drive and the first transmission member and thereby to adjust the adjusting means which is fixedly connected with the second transmission member, in its relative position relative to one of the frames.

Advantageously one of the two transmission members have a coulisse guide and the other transmission member has a pin which engages in the coulisse guide. Such a support provides a gap-free movement transmission in one plane. This movement transmission is required for bringing one of the two frames to its base position. With the special design and connection between the first and second transmission members by means of the coulisse guide and the engaging pin it is achieved that the second transmission member is kinematically coupled with respect to the first transmission member in a perpendicular plane for a gap-free movement transmission.

In accordance with the present invention the base adjustment drive and the first transmission member are connected with one another through a self-locking screw hinge. Thereby after finishing of the base adjustment, the base adjustment member and the first transmission member are retained in the selected position. Thereby also the base adjustment of a coupled frame is determined.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
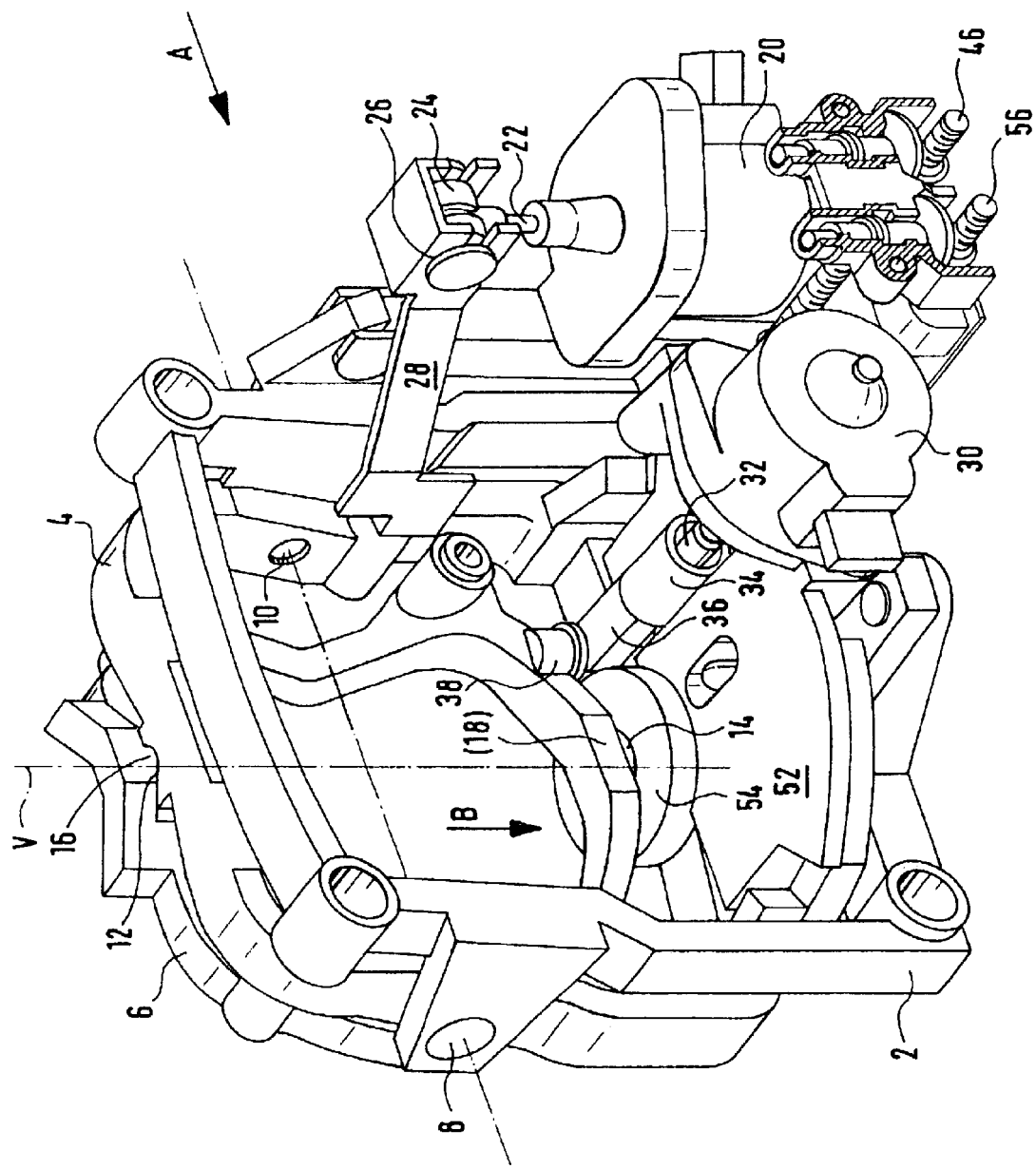
FIG. 1 is a perspective view of a part of a headlight in accordance with the present invention.

FIG. 1 is a perspective view of a head light in accordance with the present invention. It is provided with an outer frame carrier 2 which is fixed with a body and serves for receiving all parts which will be described herein below. An outer frame 4 is supported in the frame carrier 2, and an inner frame 6 is supported in the outer frame. The outer frame 4 is connected with the frame carrier 2 through bearing pins 8 and 10, so that the outer frame can be swivellable around a horizontal swivelling axis H.

Pin guides 12 and 14 are provided in the outer frame 4 and formed for engagement by pins 16, 18 which are integral with the inner frame 2. Hinges are formed by the pin 16, 18, and the pin guides 12, 14, for swivelling the inner frame 6 around a vertical axis V relative to the outer frame 4. The inner frame 6 is provided for firmly receiving not shown parts of the vehicle, such as for example a light source and a reflector and/or a projecting optical system (so-called light module). These parts are moved together with movement of the inner frame.

A light range adjusting means drive 10 is provided for driving a stroke piston 22. The stroke piston 22 is mounted on a transmission pin 24 which is guided in a pin guide 26.

The pin guide 26 is formed by a lever 28 which is fixedly connected with the outer frame 4. The outer frame 4 can be swivelled around the horizontal swivelling axis H relative to the frame carrier 2 via the light range adjusting means drive 20, the stroke piston 22, the transmission pin 24, the piston guide 26 and the lever 28. With such a swivelling, a light range regulation is executed.

The arrangement shown in FIG. 1 further has a curve light adjusting means drive 30 which operates for driving a stroke piston 32. The stroke piston 32 is connected with a transmission rod 36 through a spherical hinge 34. The transmission rod 36 is connected with the inner frame 6 through a hinge 38. A turning of the inner frame 6 around the vertical turning axis V relative to the outer frame 4 is performed via the curve light adjusting means drive 30, a stroke piston 32, the spherical hinge 34, the transmission rod 36 through the hinge 38. With such a swivelling, a curve light function is executed.

An adjustment of the inner frame 36 in a horizontal and vertical directions is possible with the above described parts. The adjustment in the horizontal direction is performed by swivelling of the inner frame 6 around the vertical turning axis V in the outer frame 4. The swivelling in a vertical direction is performed by swivelling of the outer frame 4 around the horizontal turning axis H. Thereby the light-generating elements of the headlight which are mounted on the inner frame 6 (light module) are brought to a position which is required for execution of both functions, namely "curve light regulation" or "light range regulation".

Figure 2:
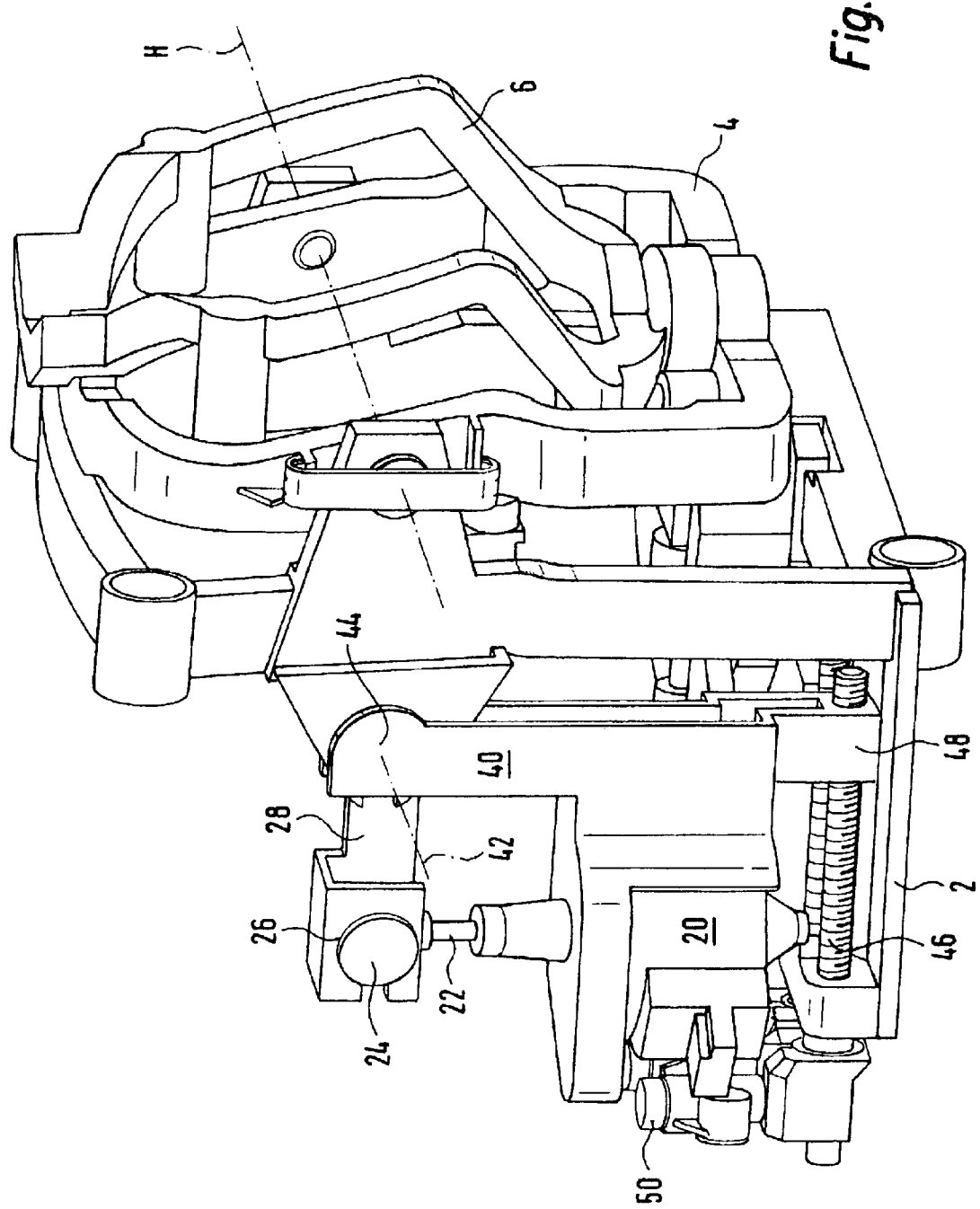
FIG. 2 is a perspective view of the arrangement of FIG. 1 as seen in observation direction A.

FIG. 2 shows an arrangement of FIG. 1 as seen in observation direction A. The frame carrier 2, the outer frame 4, as well as the inner frame 6 can be seen in this drawing. Furthermore, the above described light range adjusting means drive 20 as well as the stroke pin 22, the transmission pin 24, the pin guide 26 and the lever 28 mounted on the outer frame 4 are shown in this drawing.

The light range adjusting means drive 20 is fixedly connected with a swivel carrier 40. The swivel carrier 40 is swivellable about a swivelling axis 42. For this purpose the swivel carrier 40 is coupled to the frame carrier 2 in a frame carrier-fixed bearing 44. The swivel carrier 40 is swivellable around the axis 42. In particular, by driving a threaded spindle 46 in a screw hinge 48 a turning displacement movement is produced, which swivels a swivel carrier 40 around the axis 42. Since the screw hinge 48 is moveable along a periphery around the frame carrier-fixed bearing 44, the threaded spindle 46 is formed bendable to avoid a canting between the threaded spindle 46, the swivel carrier 40 and the frame carrier 2.

For driving the threaded spindle 46, a spindle drive 50 is provided. It has for example adjusting screws which can be turnable to produce the turning movement of the threaded spindle 46. The spindle drive 50 can be supported, for example, through hinge shafts at a location which is far from the headlight. The light range adjusting means drive 20 can be brought to a base position via the spindle drive 50, the thread spindle 46 and the swivel carrier 48. The outer frame 40 can be brought to a base position by coupling through the stroke piston 22 and the lever 28. Thereby the outer frame 40 swivels about the same horizontal axis H, about which the outer frame 4 is swivellable during driving of the light range adjusting means drive 20.

Figure 3:
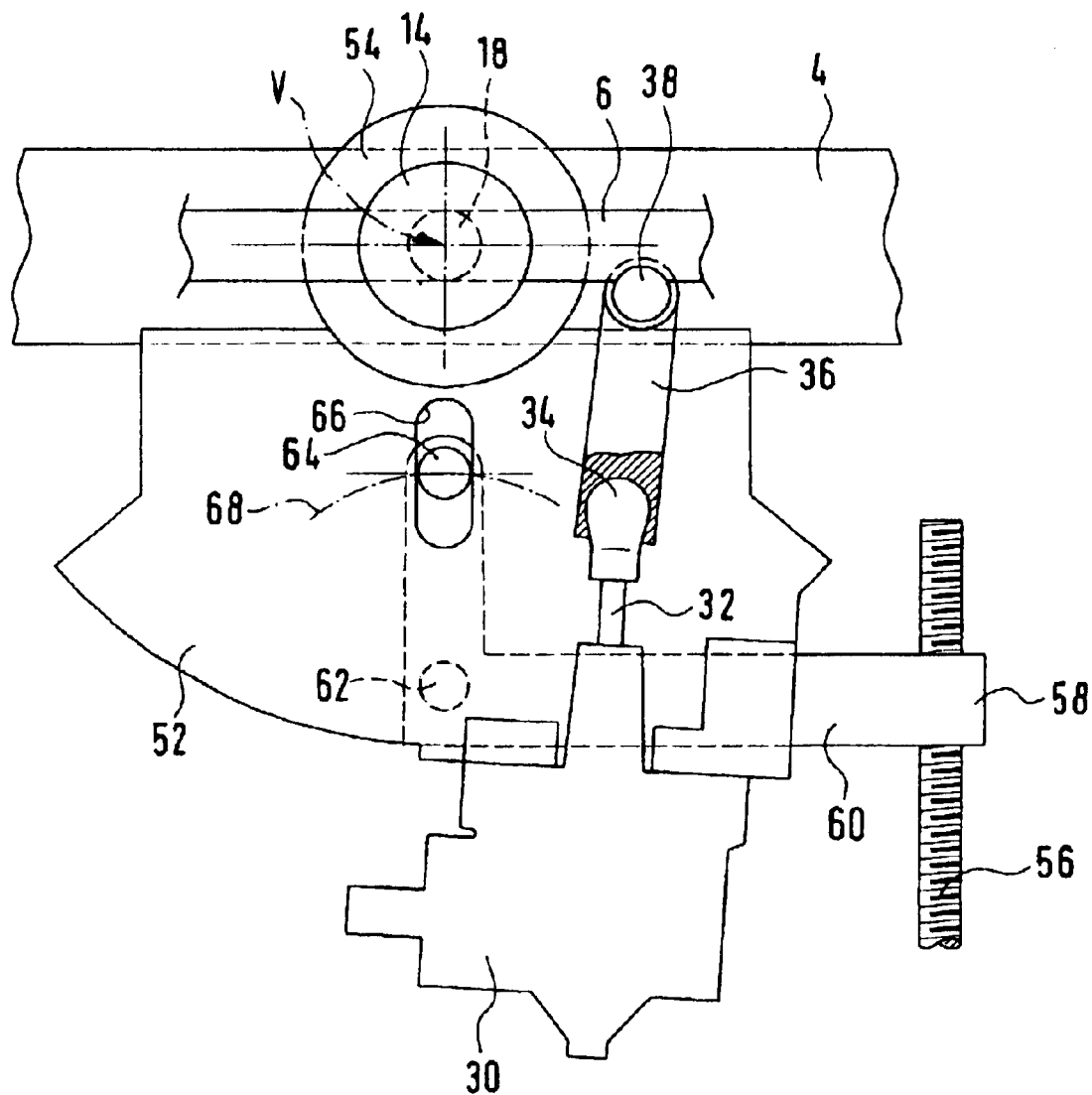
FIG. 3 is a view showing a portion of the arrangement of FIG. 1 on a plan view as seen in observation direction B.

FIG. 3 shows a portion of the arrangement of FIG. 1 as seen in observation direction B. The curve light adjusting means drive 30 is mounted on a swivel plate 52. The swivel plate 52 has a bearing ring 54 which is supported swivellably around the pin guide 14 of the outer frame 4. The stroke piston 32, the spherical hinge 34, the transmission rod 36 and the hinge 34 are visible, which are formed integrally with the inner frame 6. The inner frame 6 is supported swivellably via the pin 18 in the pin guide 14 of the outer frame 4. The second adjusting means drive 30 and thereby the inner frame 6 can be brought via the elements 32–38 to a base position. This is performed by swivelling the swivel plate 52 around the pin guide 14. For this purpose a threaded spindle 56 is provided, which can be driven by a not shown spindle drive. This threaded spindle 56 is connected with a turning lever 60 through a screw hinge 58. The turning lever 60 is turned around a frame carrier-fixed bearing 62 so that during driving of the threaded spindle 56 a rotary displacing movement in the screw hinge 58 is performed. The lever 60 has a pin 64 which engages in a coulisse guide 66 formed in the swivel plate 52.

When the lever 60 during driving of the threaded spindle 56 is turned around the frame carrier-fixed hinge 62, the pin 64 describes a circular path 68. With the engagement of the pin 64 in the coulisse guide 66, the swivel plate 52 is swivelled and in particular about the vertical swivel axis V arranged perpendicular to the plane of the drawing. Since the swivel plate 52 is swivellable around the vertical swivel axis V, the curve light adjusting means drive 30 and thereby the inner frame 6 are brought through the elements 32–38 to a base adjustment. The frame 60 is swivellable around the same vertical axis V, around which the frame 6 can swivel by actuation of the curve light adjusting means drive 30.

Figure 4:
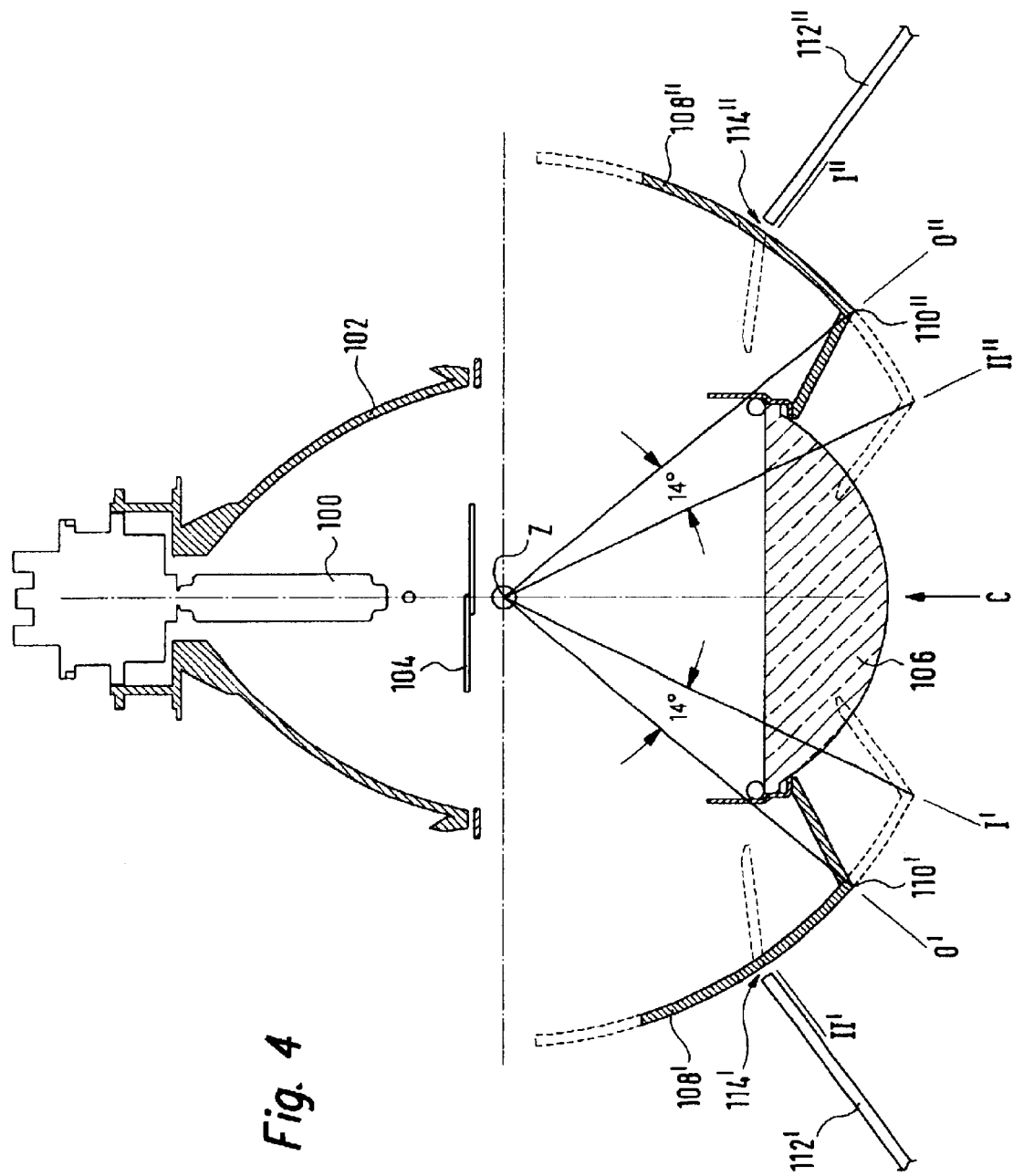
FIG. 4 is a longitudinal section through a PES headlight in accordance with the present invention.

FIG. 4 shows a section of the headlight elements for fixed arrangement of the inner frame 6 shown in FIGS. 1 and 2. In FIG. 4 a light source 100 is shown, which provides the light beam reflected by a reflector 102. Furthermore, light screen elements 104 are shown for obtaining a predetermined bright-dark limit during projection from the light source 100, and for producing the light beams deviated by the reflector 102.

The arrangement shown in FIG. 4 further has a projection optical system 106 which adjoins the co-moving screens 108', 108". The w-moving screens 108', 108" have screen edges 110', 110", which extend circularly in the view of FIG. 4 showing the PES headlight in direction of observation C. The projection optical system 106 is shown in FIG. 2 by solid lines, in which the screen edges 110', 110" have a central position 0', 0". The projection optical system 106 can be swivelled from the central position 0', 0" around a central point Z in counter clockwise direction over 14°, so that the screen edges 110', 110" assume an extreme position identified as I', I". Such a significant swivelling of the projection optical system 106 can be required for example during driving over a curve with a small radius.

The projection optical system 106 can be moved also from the central position 0', 0" to a position in which the screen edges 110', 110" assume a second extreme position identified as II', II".

FIG. 4 also shows body-fixed covers 112', 112". A gap 114' is formed between the body-fixed cover 112' and the moving screen 108'. A gap 114" is formed between the body-fixed cover 112" and the moving screen 108". It can be clearly seen that the gap sizes 114', 114" have the same size which is not dependent on whether the projecting optical system 106 and the moving screens 108' or 108" are located in their central position zero or located in their extreme positions I, II. The gaps 114', 114" can be selected as small as possible so that the projection optical system 106 is moved around the central point Z. This is possible since the projection optical system 106 is movable around the same central point Z both for the base adjustment and also for the light range or curve light adjustment in normal operation of the headlight. The view shown in FIG. 4 is applicable both for a horizontal and also for a vertical section plane through the PES headlight. For a horizontal section plane the extreme positions I and II constitute curve light positions. For a vertical section plane the extreme positions I or II constitute extreme light range positions.

It will be understood that each of the elements described above, or two or more together, may also find a useful application in other types of constructions differing from the types described above.

While the invention has been illustrated and described as embodied in headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight for a motor vehicle, comprising a light module with at least one reflector and a light source; a first frame with which at least a part of said light module is connected; first adjusting means for swivelling said first frame around a first swivel axis; a second frame in which said first frame is supported and which is swivelable around a second swivel axis; second adjusting means for swivelling said second swivel frame; a body-fixed frame support in which said second frame is supported, said frames being arranged so that said swivel axes extend perpendicular to one another and arranged in one plane; base adjustment means for adjusting at least one of said frames around an adjusting axis which is aligned with one of said swivel axes.

2. A headlight as defined in claim 1, wherein said first and second frames are adjustable through a corresponding one of said base adjusting means around a corresponding one of said adjusting axes, wherein said adjusting axes are in alignment with said swivel axes.

3. a headlight as defined in claim 1, wherein said base adjusting means is operative between said frame carrier and one of said frames and include first adjusting means and second adjusting means formed and adjust a relative position of said first adjusting means to said first frame and a relative position of said second adjusting means to said second frame.

4. A headlight as defined in claim 1, wherein said adjusting means each have an adjusting means drive and a stroke means connected with a corresponding one of said frames through a hinge.

5. A headlight as defined in claim 4, wherein said adjusting means drive is formed as a drive selected from the group consisting of a pneumatically activated drive, a hydraulically activated drive, and an electrically activated drive.

6. A headlight as defined in claim 1, wherein each of said base adjusting means has a base adjusting drive and a first transmission member connected with said base adjusting drive and swivellable about a frame carrier-fixed axis.

7. A headlight as defined in claim 6, wherein said first transmission member is coupled to a second transmission member which carries a second adjusting means drive swivellable around a frame-fixed axis.

8. A headlight as defined in claim 7, wherein one of said transmission members has a coulisse guide while another of said transmission members has a pin engaging in said coulisse guide.

9. A headlight as defined in claim 6, wherein said first transmission member carries an adjusting means drive.

10. headlight as defined in claim 6, wherein said base adjusting drive and said first transmission member are connected with one another through a self-locking screw hinge.

* * * * *